United States Patent
Caiozza

(10) Patent No.: US 6,632,354 B2
(45) Date of Patent: Oct. 14, 2003

(54) COMBINED OIL FILTER AND MAGNET APPARATUS

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 0 days.

(21) Appl. No.: 09/888,103

(22) Filed: Jun. 22, 2001

(65) Prior Publication Data

US 2002/0195383 A1 Dec. 26, 2002

(51) Int. Cl.[7] .............................................. B01D 35/06
(52) U.S. Cl. ........................ 210/223; 210/438; 210/440
(58) Field of Search ................................ 210/168, 222, 210/223, 438, 440; 184/6.25

(56) References Cited

U.S. PATENT DOCUMENTS

| | | | | |
|---|---|---|---|---|
| 3,272,342 A | * | 9/1966 | McLaren et al. | 210/440 |
| 3,289,841 A | * | 12/1966 | Quinting | 210/134 |
| 4,450,075 A | * | 5/1984 | Krow | 210/223 |
| 4,501,660 A | * | 2/1985 | Hebert | 210/209 |
| 4,529,517 A | * | 7/1985 | Carlvret | 210/223 |
| 4,883,591 A | * | 11/1989 | Belasco | 210/223 |
| 5,510,024 A | * | 4/1996 | Caiozza | 210/186 |
| 5,571,411 A | * | 11/1996 | Butler et al. | 210/223 |
| 5,647,993 A | * | 7/1997 | Karp | 210/695 |
| 5,738,785 A | * | 4/1998 | Brown et al. | 210/232 |

FOREIGN PATENT DOCUMENTS

RU             1636021 A    *   3/1991    ........... B01D/35/06

* cited by examiner

Primary Examiner—Matthew O. Savage

(57) ABSTRACT

A combined oil filter and magnet apparatus of the invention generally is comprised of an oil filter and a removable and reusable magnet unit attached to the oil filter. The removable and reusable magnet unit attracts and retains ferro-magnetic particles present in the oil flowing inside the oil filter, thereby separating those particles from the flowing oil. Inside the oil filter, an oil flow director is provided to direct oil flow to the vicinity of the removable and reusable magnet unit. With a first embodiment of the invention, the removable and reusable magnet unit is partially received in a centrally located filtered oil flow space inside the oil filter. With a second embodiment of the invention, the removable and reusable magnet unit is completely external to the interior of the oil filter.

26 Claims, 10 Drawing Sheets

COMBINED OIL FILTER AND MAGNET APPARATUS

BACKGROUND OF THE INVENTION

1. Field of the Invention

The present invention relates generally to oil filter devices and, more particularly, to oil filter devices mounted on motor vehicles.

2. Description of the Prior Art

The use of oil filtering devices for motor vehicles is known in the prior art. In my prior patent U.S. Pat. No. 5,510,024 there is disclosed a magnet assembly or attachment for magnetically collecting metallic particles within an oil filter. That inventive device includes a pair of magnets supported in a spaced relationship by a carrier which latter is positionable substantially anywhere along an exterior of an oil filter canister. The carrier serves an additional function of a heat sink. A shunt couples opposite poles of the magnets together to increase the magnetic flux directed into the oil filter to separate and retain metallic particles from the filtered fluid.

An oil lubrication circuit of a motor vehicle includes a variety of components, and such components generally include a mounting stem for an oil filter, an oil output channel in the mounting stem for allowing filtered oil to exit from the oil filter and circulate in the oil lubrication circuit, and an oil input channel, present in the engine for channelling oil from the engine into the oil filter.

The interior of a conventional oil filter generally includes a centrally located filtered oil flow space and an array of filter material arrayed circumferentially around the centrally located filtered oil flow space. Inside the conventional oil filter, oil flows in a diffuse pattern radially from circumferential positions outside the filter material, through the filter material, and into the centrally located filtered oil flow space. It is noted that when the magnet attachment is used for a conventional oil filter, as disclosed in the above-mentioned U.S. Pat. No. 5,510,024, only a relatively small portion of the oil flowing through the conventional oil filter cartridge is exposed to strong magnetic fields as the oil flows through the conventional oil filter. To increase the efficiency of a magnet attachment for an oil filter suitable for trapping potentially harmful metallic or ferro-magnetic particles and thereby separating the ferro-magnetic particles from the flowing oil, it would be desirable if an oil filter construction were provided which directs a concentrated flow of oil inside the oil filter cartridge in the vicinity of a magnet attachment.

Still other features would be desirable in a combined oil filter and magnet apparatus. It would be desirable if a removable and reusable magnet unit were provided that can easily be fitted into and can easily be removed from an oil filter. In addition, since, in a conventional oil filter, the centrally located filtered oil flow space is relatively unobstructed, it would be desirable if a removable and reusable magnet unit can be fitted into the centrally located filtered oil flow space.

As stated above, it is desirable if a concentrated flow of oil inside an oil filter is directed to the vicinity of a magnet attachment. With this in mind, and with the idea of using the unobstructed centrally located filtered oil flow space to good advantage, it would be desirable if an oil flow director were installed in the centrally located filtered oil flow space so as to direct a concentrated flow of oil to the vicinity of a removable and reusable magnet unit.

A conventional oil filter normally is disposed of after use. A removable and reusable magnet unit used with such a disposable oil filter offers economic advantages. More specifically, it would be desirable if a combined oil filter and magnet apparatus were provided which employs a disposable and replaceable oil filter cartridge and employs a removable and reusable magnet unit that can be removed from the oil filter after cleaning thereof and prior to insertion of a replaceable oil filter cartridge. Such a device can be reused as a new or fresh oil filter cartridge without disposing of the original oil filter housing.

Thus, while the foregoing body of prior art indicates it to be well known to use a conventional oil filter that has a magnet attachment attached thereto, the prior art described above does not teach or suggest a combined oil filter and magnet apparatus which has the following combination of desirable features: (1) directs a concentrated flow of oil inside the oil filter housing in the vicinity of a magnet attachment; (2) can easily be fitted into and can easily be removed from an oil filter housing; (3) provides a removable and reusable magnet unit can be fitted into the centrally located filtered oil flow space of an oil filter; (4) provides an oil flow director that is installed in the centrally located filtered oil flow space so as to direct a concentrated flow of oil to the vicinity of a removable and reusable magnet unit; (5) employs a disposable and replaceable oil filter cartridge and employs a removable and reusable magnet unit that can be removed from an oil filter after cleaning and prior to insertion of a fresh oil filter material cartridge such that the oil filter may be reused as a new or fresh oil filter; and (6) employs a disposable and replaceable oil filter and employs a removable and reusable magnet unit that can be reused with another, fresh oil filter after the original oil filter with which it was used has been discarded.

The foregoing desired characteristics are provided by the unique combined oil filter and magnet apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a combined oil filter and magnet apparatus that generally is comprised of an oil filter housing which includes an oil output fitting, a filter material/flow director support attached to the oil output fitting, a removable quantity of filter material attached to the filter material/flow director support, a centrally located filtered oil flow space defined by the quantity of filter material, and a housing attached to the oil output fitting which houses the filter material/flow director support, the quantity of filter material, and the centrally located filtered oil flow space. The oil filter housing includes a bottom housing portion attached to the oil output fitting, wherein the bottom housing portion includes oil input channels and includes an oil sealing ring, and further includes an oil flow director attached to the filter material/flow director support and extending into the centrally located filtered oil flow space. A removable and reusable magnet unit is adapted to be attached to a receptacle in the filter housing that protrudes into the centrally located filtered oil flow space defined by the quantity of filter material supported in the filter housing, whereby when installed in the receptacle the removable and reusable magnet unit is in the vicinity of oil flow directed by the oil flow director.

With one embodiment of the invention, the removable and reusable magnet unit includes a magnet unit that is partially received in the centrally located filtered oil flow space. The internally-received removable and reusable magnet unit is partially nested in a receptacle inside the oil flow director. The oil flow director and the receptacle are oriented along a central longitudinal axis of the oil filter. The filter housing includes a magnet unit entry port located distal to the oil output fitting, and a portion of the removable and reusable magnet unit extends into the receptacle and the centrally located filtered oil flow space.

The removable and reusable magnet unit includes a first lock bolt reception channel. The oil filter housing further includes magnet unit support members attached to the housing proximal to the opening of the magnet unit receiving receptacle, and the magnet unit support members include second lock bolt reception channels. A lock bolt is received in the first lock bolt reception channel and the lock bolt reception channels, and a lock pin is received in the lock bolt for securing the lock bolt to the magnet unit support members and the removable and reusable magnet unit.

The removable and reusable magnet unit further includes a magnet support rack and a plurality of individual magnets are received in the magnet support rack. The magnet support rack also includes the first lock bolt reception channel. The magnet support rack extends along a central longitudinal axis of the oil filter. The magnet support rack includes a heat sink portion, and the first lock bolt reception channel is located in the heat sink portion.

The magnets are cylindrical magnets, and each cylindrical magnet has a north pole end and a south pole end at opposite longitudinal ends of a respective magnet. The cylindrical magnets are arrayed in the magnet support rack with their respective longitudinal axes lying in planes that are parallel to each other. In addition, the cylindrical magnets are arrayed in the magnet support rack with their respective longitudinal axes rotated ninety degrees in their respective planes with respect to longitudinal axes of adjacent cylindrical magnets. A flux-field re-directing member is associated with the topmost magnet in the magnet support rack.

With another embodiment of the invention, the removable and reusable magnet unit includes a removable and reusable magnet unit that is completely external to the centrally located filtered oil flow space. The removable and reusable magnet unit is located on the oil filter housing along a central longitudinal axis of the oil filter. The removable and reusable magnet unit includes a heat sink portion that rests on the oil filter housing, and a magnet is adapted to be attached to a topside of the heat sink portion.

The oil filter further includes a pair of magnet unit support members connected to the oil filter housing. The magnet unit support members include lock bolt reception channels, and the magnet unit support members extend longitudinally outward from the oil filter housing.

The oil flow director can include a flat director base portion and a director wall portion that extends longitudinally outward from the flat director base portion.

With yet another embodiment of the invention, the oil filter housing can include a first housing portion which includes external threads and can include a second housing portion which includes an outer wall portion which includes internal threads. In this respect, the first housing portion and the second cartridge housing portion are connected together by screwing the external threads into the internal threads.

With another aspect of the invention, the second housing portion includes the oil output fitting which includes a baffle portion for directing oil flow from the oil flow director.

With yet another embodiment of the invention, the oil output fitting of the second housing portion includes an annular fitting shoulder which receives a top portion of the oil flow director. The filter housing includes a flat annular region, and an annular shoulder extending toward the bottom housing portion from the flat annular region. With still another embodiment of the invention, the first housing portion includes a flat bottom.

With yet another embodiment of the invention, the second housing portion includes an upstanding lip, and the first cartridge housing portion includes a wrap-around rolled edge which fits tightly over and around the upstanding lip.

With still another embodiment of the invention, the director wall portion can be comprised of a plurality of planar wall portions which form a polygonal or square cross-section director. The square cross-section director can be formed from a flow director blank which includes a wall lock tab, a lock tab reception notch, and a plurality of wings.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several alternatively preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combined oil filter and magnet apparatus which has all of the advantages of the prior art and none of the disadvantages.

It is another object of the present invention to provide a new and improved combined oil filter and magnet apparatus which may be easily and efficiently manufactured and marketed.

It is a further object of the present invention to provide a new and improved combined oil filter and magnet apparatus which is of durable and reliable construction.

An even further object of the present invention is to provide a new and improved combined oil filter and magnet apparatus which is susceptible of a low cost of manufacture with regard to both materials and labor, and which accordingly is then susceptible of low prices of sale to the consuming public, thereby making such combined oil filter and magnet apparatus available to the buying public.

Still yet a further object of the present invention is to provide a new and improved combined oil filter and magnet apparatus which directs a concentrated flow of oil inside the oil filter in the vicinity of a magnet attachment.

Still another object of the present invention is to provide a new and improved combined oil filter and magnet apparatus that can easily be fitted into and can easily be removed from an oil filter housing.

Yet another object of the present invention is to provide a new and improved combined oil filter and magnet apparatus which provides a removable and reusable magnet unit that can be fitted into the centrally located filtered oil flow space of an oil filter.

Even another object of the present invention is to provide a new and improved combined oil filter and magnet apparatus that provides an oil flow director that is installed in the centrally located filtered oil flow space so as to direct a concentrated flow of oil to the vicinity of a removable and reusable magnet unit.

Still a further object of the present invention is to provide a new and improved combined oil filter and magnet apparatus which employs a disposable and replaceable oil filter cartridge and employs a removable and reusable magnet unit that can be reused with the oil filter after a new oil filter cartridge has replaced a prior, used oil filter cartridge.

Yet still another object of the present invention is to provide a new and improved combined oil filter and magnet apparatus which employs a disposable and replaceable oil filter and employs a removable and reusable magnet unit that can be reused with another, fresh oil filter after the original oil filter with which it was used has been discarded.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved combined oil filter and magnet apparatus embodying the principles and concepts of the present invention will be described.

Figure 1:
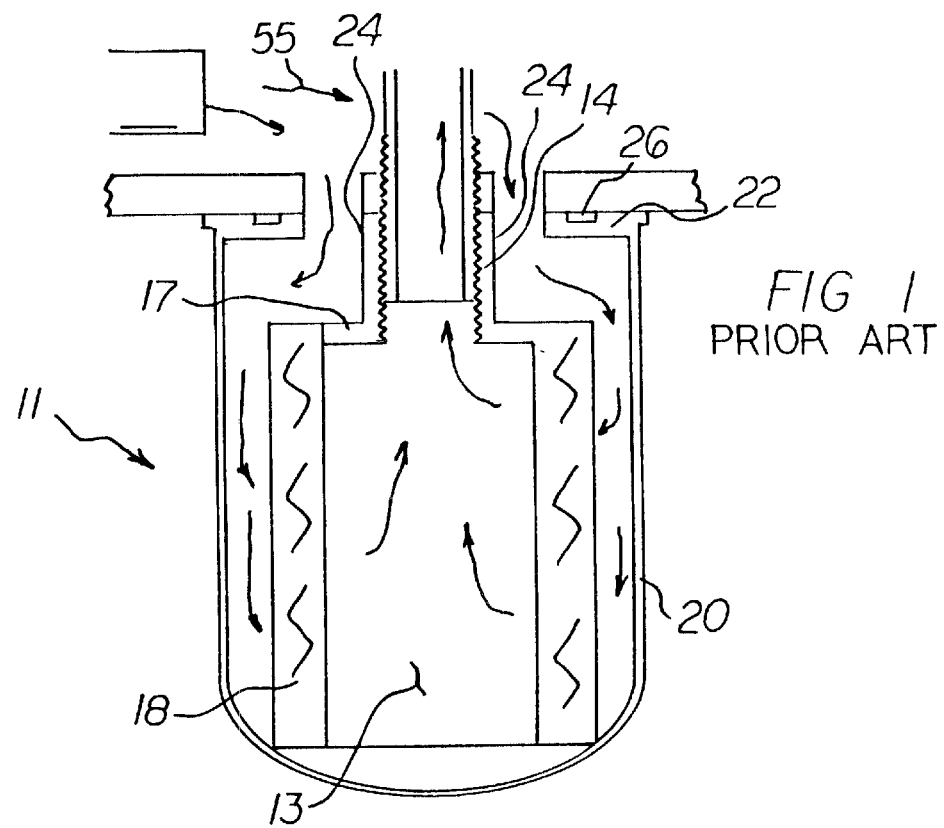
FIG. 1 is a cross-sectional view showing a PRIOR ART, conventional, disposable and replaceable oil filter.
Figure 2:
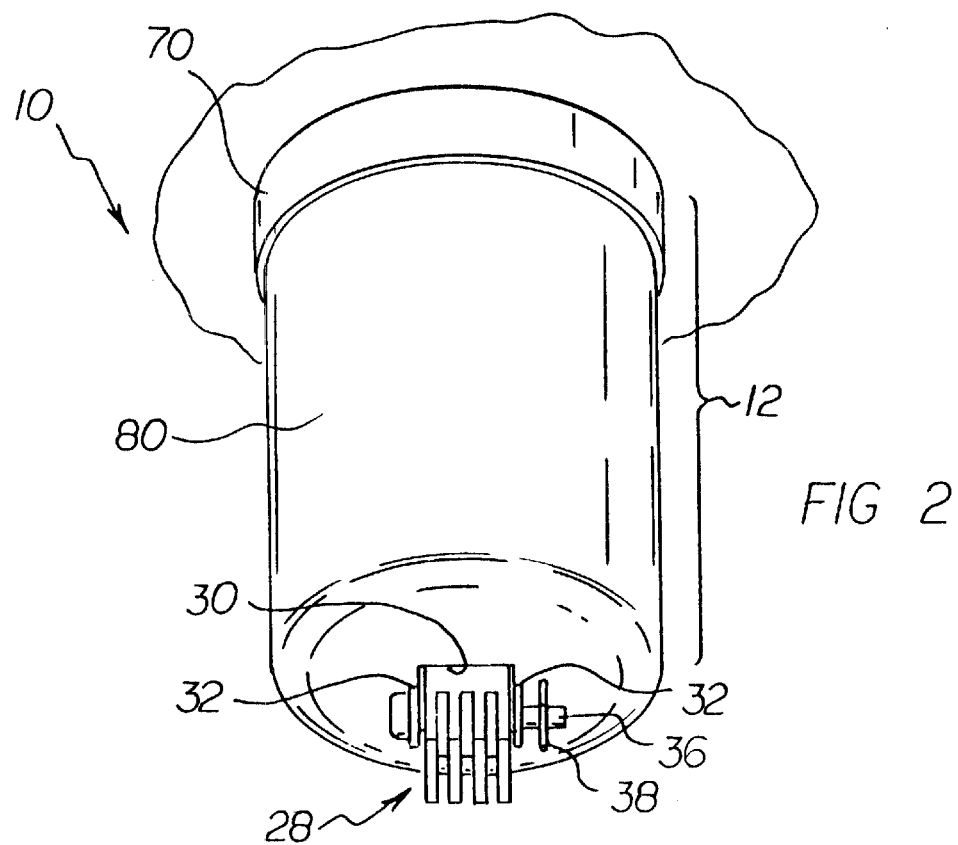
FIG. 2 is a perspective view of a first embodiment of the combined oil filter and magnet apparatus of the invention which employs a removable and reusable magnet unit that is inserted inside the centrally located filtered oil flow space of an oil filter and which latter employs a housing that has a first housing portion and a second housing portion that are connected together by complimentary threads.
Figure 3:
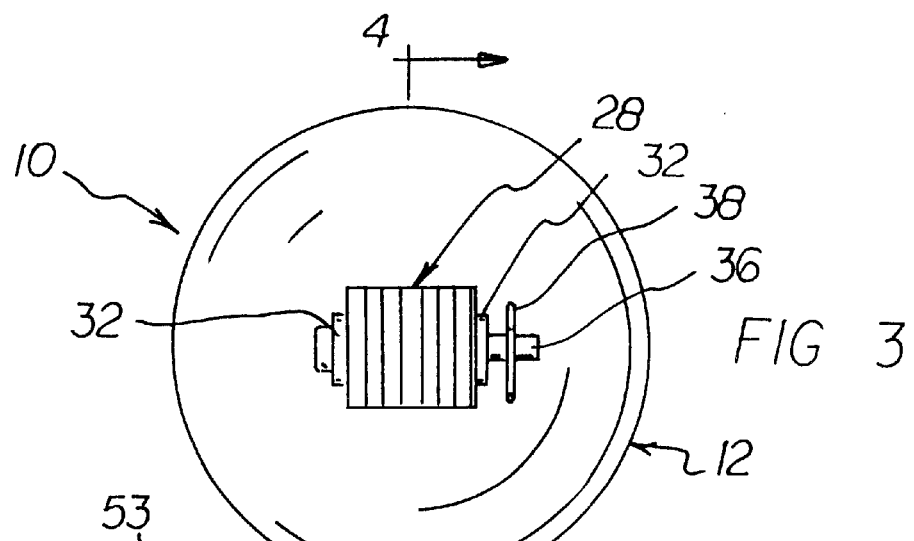
FIG. 3 is a top view of the embodiment of the combined oil filter and magnet apparatus of FIG. 2.

FIG. 1 discloses a PRIOR ART conventional oil filter 11 which includes an oil output fitting 14, a filter material support 17 attached to the oil output fitting 14, an oil filter cartridge or quantity of filter material 18 attached to the filter material support 17, a centrally located filtered oil flow space 13 defined by the material of a conventional oil filter cartridge 18, and an oil filter housing 20 attached to the oil output fitting 14 which houses the filter material support 17, the quantity of filter material 18, and the centrally located filtered oil flow space 13. The oil filter housing 20 includes a bottom housing portion 22 attached to the oil output fitting 14. The bottom housing portion 22 includes oil input channels 24 and includes an oil sealing ring 26.

Turning to FIGS. 2–6, a first embodiment of the invention of a combined oil filter and magnet apparatus is shown. Reference numerals are shown that correspond to like reference numerals that designate like elements shown in the other figures. In general, combined oil filter and magnet apparatus 10 of the invention is comprised of an oil filter housing 12 which includes an oil output fitting 14, a filter material/flow director support 16 attached to the oil output fitting 14, a removable oil filter cartridge or quantity of filter material 18 attached to the filter material/flow director support 16, a centrally located filtered oil flow space 13 defined by the quantity of filter material 18, and an oil filter housing 20 attached to the oil output fitting 14 which houses the filter material/flow director support 16, the quantity of filter material 18, and the centrally located filtered oil flow space 13. The oil filter housing 20 includes a bottom housing portion 22 attached to the oil output fitting 14, wherein the bottom housing portion 22 includes oil input channels 24 and includes an oil sealing ring 26, and the oil filter housing 12 includes an oil flow director 25 attached to the filter material/flow director support 16 and extending into the centrally located filtered oil flow space 13. In accordance with the present invention, a removable and reusable magnet unit or assembly indicated generally by reference sign 28 is adapted to be attached suitably to the oil filter housing 20, and the removable and reusable magnet unit 28 when so attached is disposed in the vicinity of oil flow directed by the oil flow director 25.

Figure 4:
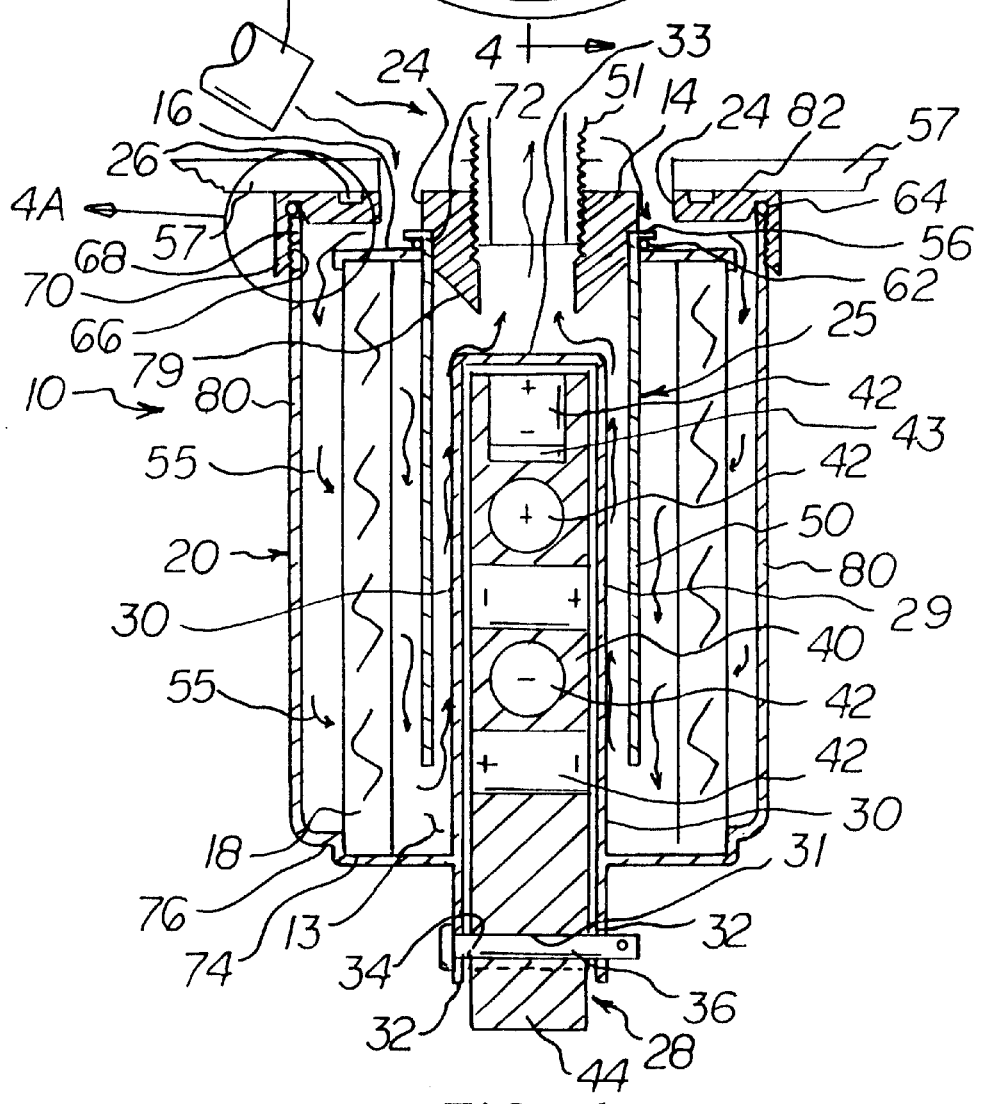
FIG. 4 is a cross-sectional view of the embodiment of the invention shown in FIG. 3 taken along line 4—4 thereof.

Specifically, with respect to a first preferred embodiment of the invention shown in FIGS. 2–6, the removable and reusable magnet unit 28 is adapted to be partially received in the centrally located filtered oil flow space 13. To facilitate this arrangement, the oil filter housing 20 has an inwardly directed continuous wall portion 29 forming a suitable receptacle 30 for the partially received magnet unit 28 substantially as depicted in FIG. 4. As shown in FIG. 4, the receptacle 30 is terminated substantially centrally, coaxially and distally inside filter housing 20 by a substantially flat end wall section 33 of continuous wall portion 29. By means of receptacle 30, the internally-received removable and reusable magnet unit 28 suitably is adapted to be partially nested inside the oil flow director 25 which, as receptacle 30, is oriented concentrically or co-axially with respect to an imaginary central longitudinal axis of the oil filter housing 12. The oil flow director 25 includes a director base portion 56 and a director wall portion 50 that extends longitudinally along the imaginary central axis of the oil filter housing 12 from the director base portion 56. The flat director base portion 56 and the director wall portion 50 can be made as a unified, one-piece structure.

The receptacle 30 in the oil filter housing 20 includes an entry port or opening for the magnet unit 28 located in the bottom wall of the housing 12 distal to the oil output fitting 14 (FIGS. 2 and 5), and as will be made more apparent below, a portion of the removable and reusable magnet unit 28 is adapted to extend by way of receptacle 30 through the magnet unit entry port into the centrally located, filtered oil flow space 13.

In the preferred embodiment of FIGS. 2–6, the removable and reusable magnet unit 28 includes a first lock bolt reception channel 31. The oil filter housing 12 further includes magnet unit support members 32 attached to the oil filter housing 20 adjacent to the entry port of receptacle 30, and the magnet unit support members 32 include second lock bolt reception channels 34. A lock bolt 36 is adapted to be received in the first lock bolt reception channel 31 and the lock bolt reception channels 34, and a lock pin 38 is adapted to be received in the lock bolt 36 for securing the lock bolt 36 to the magnet unit support members 32 and the removable and reusable magnet unit 28 when desired.

The removable and reusable magnet unit 28 includes a magnet support rack 40. As will be described in more detail below, a plurality of individual magnets 42 are received in the magnet support rack 40. The magnet support rack 40 includes the first lock bolt reception channel 31. The magnet support rack 40 extends along the imaginary central longitudinal axis of the oil filter housing 12. The magnet support rack 40 includes a heat sink portion 44, and the first lock bolt reception channel 31 is located proximal to the heat sink portion 44.

The magnets 42 supported in rack 40 are conventional cylindrical magnets, preferably of the known neo-dymium iron boron type. Each cylindrical magnet has a north pole end and a south pole end at opposite longitudinal ends of a respective magnet. Generally, the cylindrical magnets 42 are arrayed in the magnet support rack 40 with their respective longitudinal axes lying in planes that are parallel to each other. In addition, the cylindrical magnets 42 are arrayed in the magnet support rack 40 with their respective longitudinal axes rotated 90° in their respective planes with respect to longitudinal axes of adjacent cylindrical magnets 42. It will be understood that rack 40 may be of any suitable configuration such as square, rectangular, cylindrical or elliptical in cross-sectional shape so long as the cross-sectional shape of receptacle 30 closely conforms thereto. In the preferred embodiment of FIGS. 2–6, both rack 40 and receptacle 30 have a polygonal or square cross-sectional shape.

More specifically, in the embodiment of FIGS. 2–6, the highly preferred magnet array comprises 5 cylindrical magnets disposed in an advantageous, uniquely spaced manner on rack 40. Thus, in accordance with another important feature of the present invention, the top magnet has an upright orientation and is resting upon a magnetic flux re-directing disk 43. Disc 43, which is of conventional ferro-magnetic material, causes the flux field of the top magnet to be focused upwardly as shown schematically in FIG. 4B whereby a higher intensity of magnetic flux is focused in the space immediately above the end wall 33 of continuous wall portion 29 when the magnet unit 28 is received in receptacle 30. The bottom 4 or remaining cylindrical magnets 42 in rack 40 are positioned with their longitudinal axes parallel, but rotated 90° respectively with respect to each other, substantially as shown. These other 4 magnets 42 do not employ a flux re-directing disc, and accordingly, the corresponding flux field intensity generated by the other magnets in the array substantially is directed laterally as is also depicted schematically in FIG. 4B.

To use the embodiment of the invention shown in FIGS. 2–6, specific reference is made to FIG. 4 in which the combined oil filter and magnet apparatus 10 is adapted to be attached to a motor vehicle engine by screwing the oil output fitting 14 onto the conventional threaded filter housing reception post 51 on the wall surface of a typical motor vehicle engine, indicated by reference sign 57. When this is done, the oil sealing ring 26 forms an oil tight seal between the bottom housing portion 22 of the oil filter and magnet apparatus 10 and the motor vehicle engine 57. Oil is pumped from the usual output pipe 53 of the vehicle engine oil pump through the oil input channels 24 of the combined oil filter and magnet apparatus 10. Direction and path of oil flow are indicated by flow arrows 55. Oil flows through the oil input channels 24 and around the outside portions of the material of removable oil filter cartridge material 18. Oil passes through the quantity of filter material 18 and enters a portion of the centrally located filtered oil flow space 13 that lies between the quantity of filter material 18 and the director wall portion 50 of the oil flow director 25. Oil flows downward to the end of the director wall portion 50 and then reverse direction and flows upward once the end of the director wall portion 50 is reached and though the annular channel or clearance space defined by flow director wall portion 50 and continuous wall portion 29. The oil thus flows past the magnet support rack 40 of the internally-received removable and reusable magnet unit 28. The oil that is near the magnet support rack 40 is subjected to high magnetic fields, and the ferro-magnetic particles in the oil are magnetically attracted by the cylindrical magnets 42 residing in the internally-received removable and reusable magnet unit 28 sufficiently to adhere to the surface of continuous wall portion 29 confronting wall portion 50 of flow director 26. The magnetic forces of the cylindrical magnets 42 fix the ferro-magnetic particles onto the aforementioned surface of wall portion 29, thereby separating the ferro-magnetic or metal particles from the oil. The magnetic filtering of particles from the oil flowing through the present apparatus 10 is particularly effective in the region above and proximal to the end wall section 33 because (i) this space being relatively larger than the cross-sectional area of the annular clearance between wall portion 50 and wall portion 29, the oil flow velocity decreases therein increasing the filter time per unit of oil flow, and (ii) the high flux density in this space is relatively high due to the aforementioned action of the flux field re-directing disk 43 (see FIG. 4B).

After being treated (filtered) by the magnetic forces, the oil passes through the oil output fitting 14, and into the threaded oil filter reception post 51 which is hollow and thus, the vehicle engine 57 receives filtered oil from the combined oil filter and magnet apparatus 10 as will be appreciated by the routineer.

When the oil filter housing 12 is to be cleaned, the combined oil filter and magnet apparatus 10 is unscrewed from the threaded oil filter reception post 51 and is removed from the motor vehicle engine 57. Then, oil is drained out from the combined oil filter and magnet apparatus 10. Then, the lock pin 38 is removed from the lock bolt 36, the lock bolt 36 is pulled out from the magnet unit support members 32 and the first lock bolt reception channel 31, and the internally-received removable and reusable magnet unit 28 is pulled out from the oil filter housing 12. Then, the oil filter cartridge 18 can be discarded. A fresh oil filter cartridge 18 is then obtained. The ferro-magnetic particles that have been separated from the oil and that are clinging to the outside wall surface of continuous wall portion 29 are next removed by appropriate flushing or other cleaning method. Then, the newly obtained oil filter cartridge 18 is installed in housing 12. Then, the removable and reusable magnet unit 28 is ready for reuse, i.e. the internally-received removable and reusable magnet unit 28 is inserted into the fresh oil filter housing 12. Then, the lock bolt 36 is threaded through the magnet unit support members 32 and the first lock bolt reception channel 31, and the lock pin 38 is threaded into the end of the lock bolt 36. Once this is done, the internally-received removable and reusable magnet unit 28 can be reused on the new or fresh oil filter housing 12.

Figure 4A:
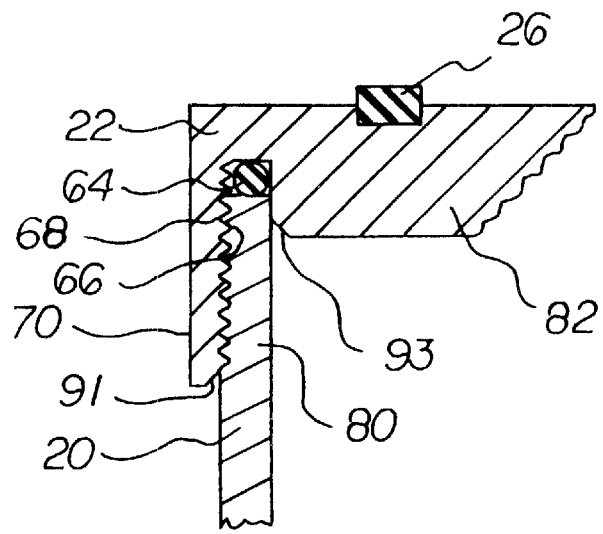
FIG. 4A is an enlarged fragmentary cross-sectional view of the embodiment of the invention shown in FIG. 4 showing the interface between the filter housing first and second portions.
Figure 4B:
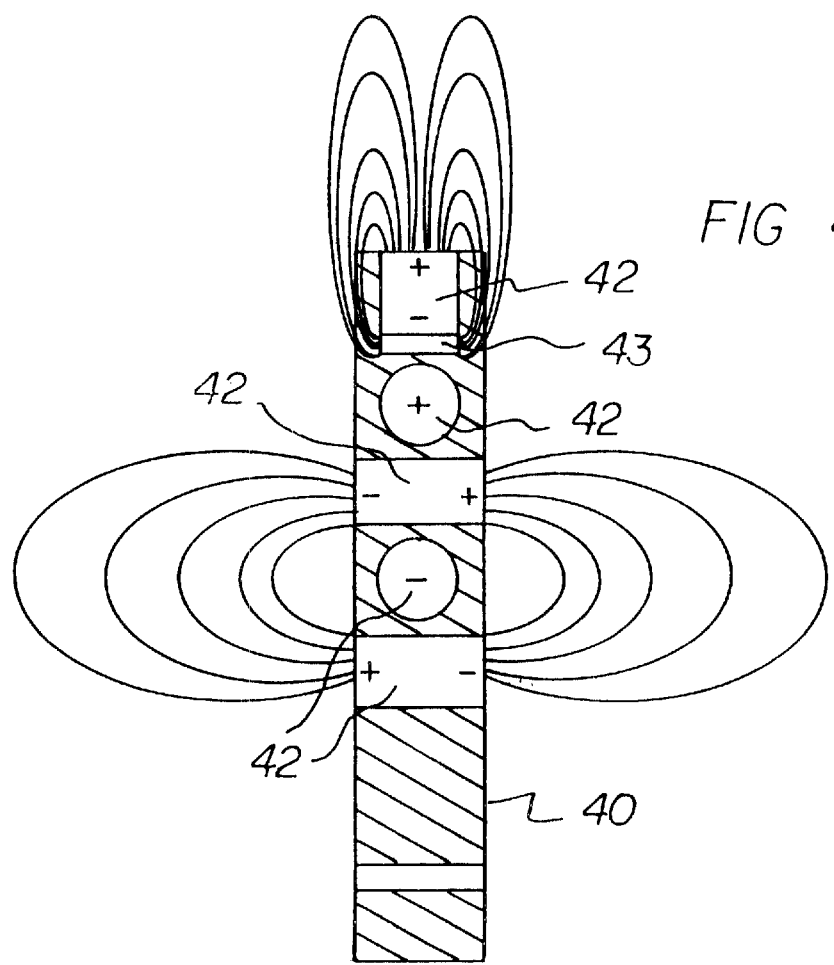
FIG. 4b is a diagrammatic view of the magnetic unit employed with the invention shown in FIGS. 2–6 schematically depicting the influence of the disk 43 on the magnetic flux field generated by the magnetic unit.
Figure 5:
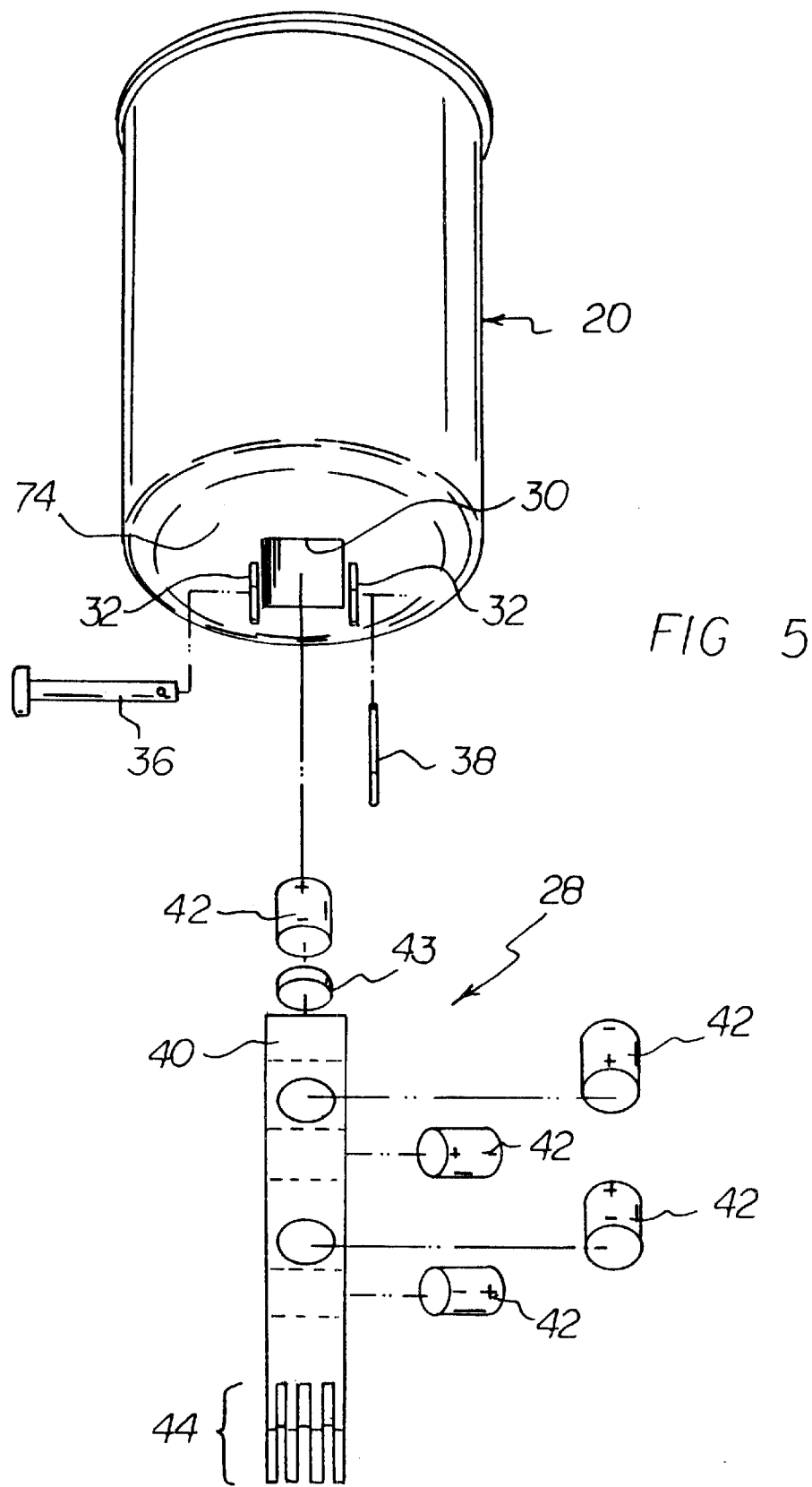
FIG. 5 is a partially exploded perspective view of the embodiment of the invention shown in FIGS. 2–4 showing the removable and reusable magnet unit that is adapted to be inserted into the centrally located filtered oil flow space.
Figure 6:
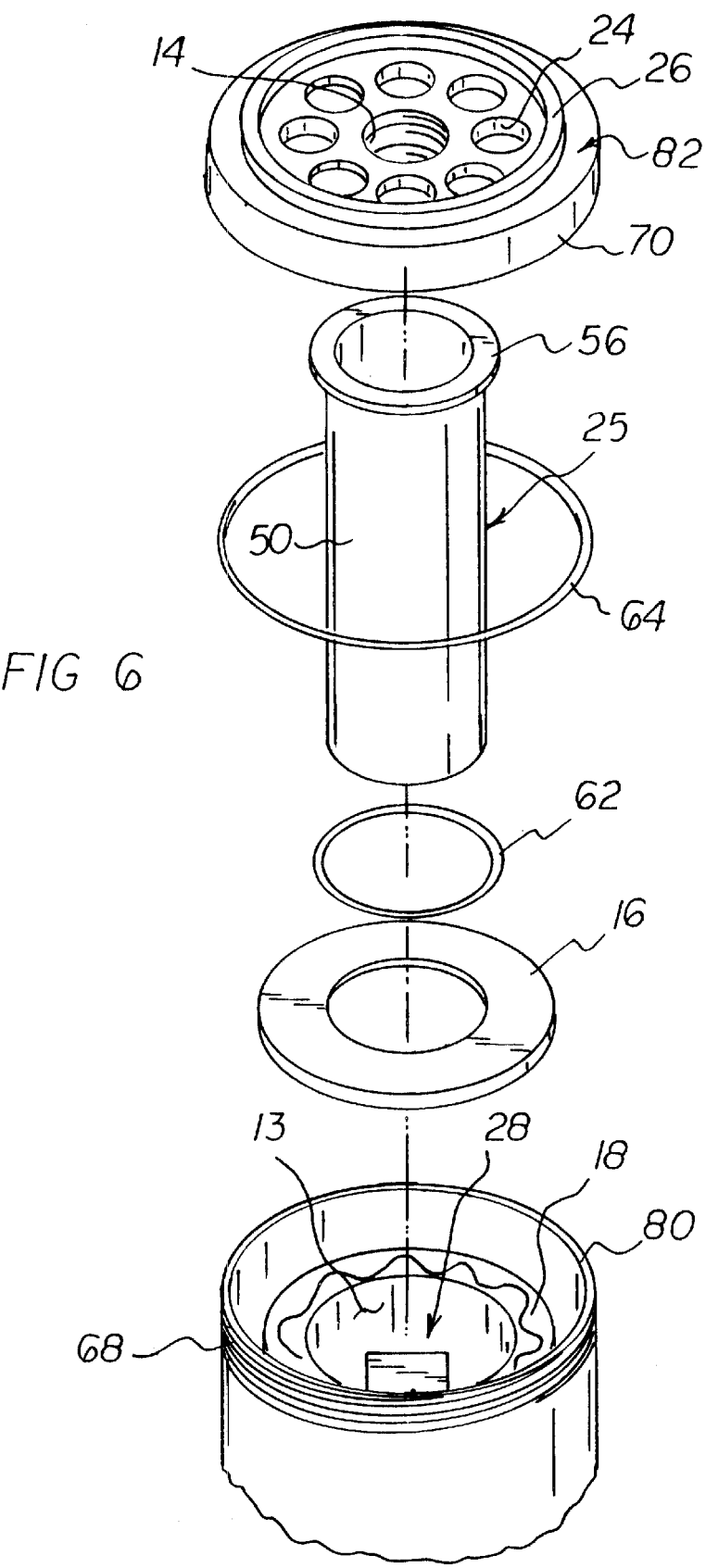
FIG. 6 is a partially exploded perspective view of the embodiment of the invention shown in FIGS. 2–5 showing an oil flow director that is located in the centrally located filtered oil flow space and showing the filter housing first portion and the filter housing second portion.
Figure 7:
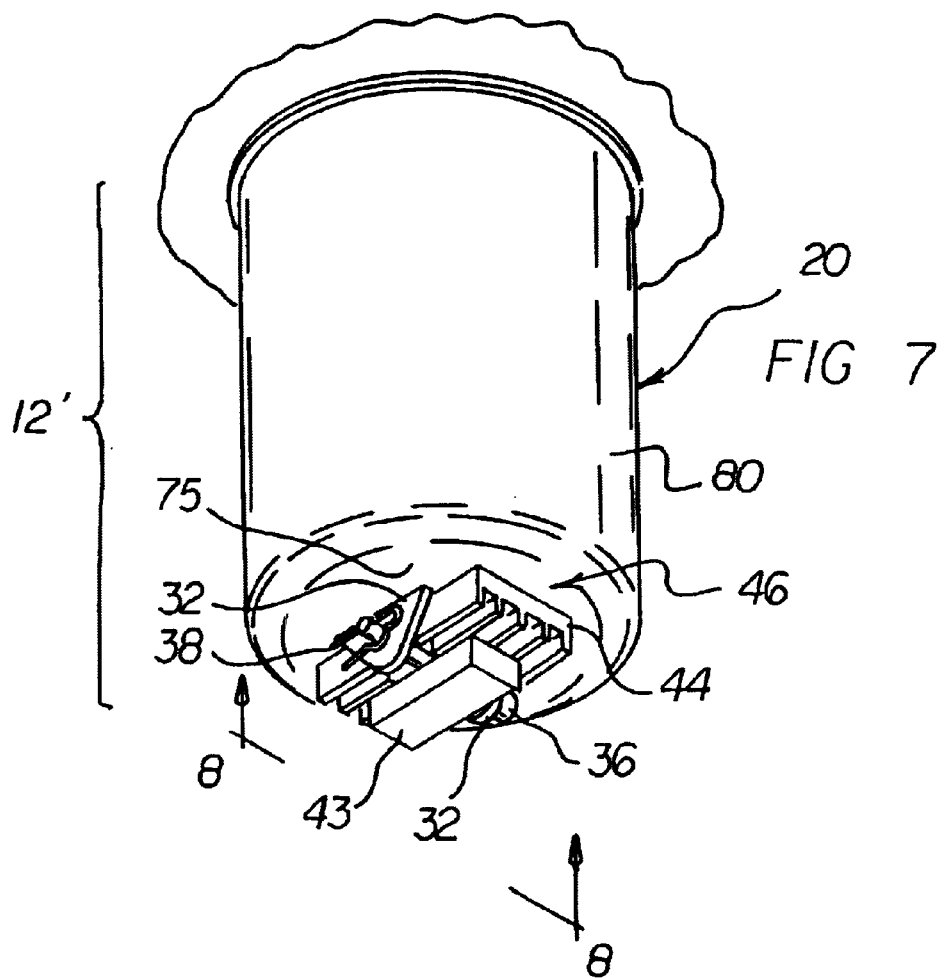
FIG. 7 is a perspective view of a second embodiment of the combined oil filter and magnet apparatus of the invention which employs a removable and reusable magnet unit that is located on the outside of the oil filter housing, which includes a first housing portion connected to a second housing portion with a rolled lip connection, and which includes a flat annular region on the bottom of the first housing portion.
Figure 8:
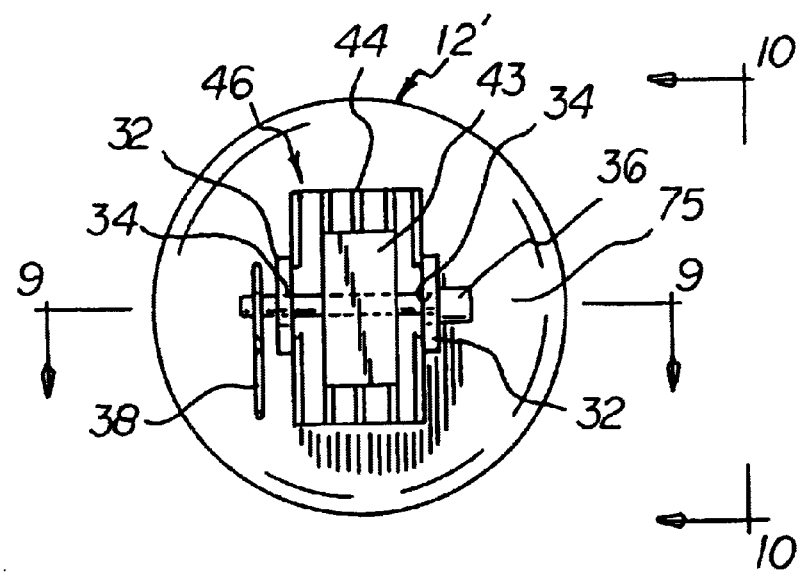
FIG. 8 is a top view of the embodiment of the combined oil filter and magnet apparatus of FIG. 7.

In accordance with yet another feature of the embodiment of FIGS. 2–6, and particularly in respect of FIGS. 4 and 4A, the filter housing 20 includes a first housing portion 80 which includes external threads 68. A second housing portion 82 which includes an outer wall portion 70 which includes internal threads 66, and the first housing portion 80 and the second housing portion 82 are connected together by screwing the external threads 68 into the internal threads 66. To facilitate proper mating engagement of these parts, the inside peripheral edge of outer wall portion 70 and the confronting inside peripheral edge of second housing portion 82 are suitably beveled or chamfered as at 91 and 93, respectively. The first housing portion 80 and the second housing portion 82 can be made from different metallic materials which have different rates of heat expansion. For example, the first housing portion 80 can be made from iron-based metal, and the second housing portion 82 can be made from aluminum-based metal. As a result, the connection between the internal threads 66 of the second housing portion 82 and the external threads 68 of the first housing portion 80 is made more secure and tighter when the entire structure is heated due to engine and engine oil heat from an operating engine, i.e. these parts become locked in place under operating conditions.

Also, as shown in FIG. 4A, a first-housing-portion-to-second-housing-portion sealing ring 64 is located in a suitable peripheral groove (not labeled) between the first housing portion 80 and the second housing portion 82 to further help tightly seal these parts and avoid oil leaks.

Also, as shown in FIG. 4, a conventional oil filter sealing ring 62 is provided between the flat director base portion 56 and the filter material/flow director support 16. The second housing portion 82 includes the oil output fitting 14 which includes a baffle portion 79 for directing desired oil flow from the oil flow director 25 and is especially advantageous in helping to direct oil flow toward the top of end wall 33, a region of maximum magnetic field flux density.

It will be appreciated that the oil output fitting 14 of the second housing portion 82 includes an annular fitting shoulder 72 which abuttingly receives a top portion of the oil flow director 25 when first housing portion 80 and second housing portion 82 are threadedly mated together. The pressing of the annular fitting shoulder 72 against the flat director base portion 56, which in turn presses against the director-base-to-director-support sealing ring 62, which in turn presses against the filter material/flow director support 16 provides a secure oil tight seal.

The housing 20 furthermore includes a flat annular region 74 at the bottom thereof (FIG. 4), and an adjacent annular shoulder 76 extending upward as viewed in FIG. 4 toward housing portion 82. The flat annular region 74 provides an internal flat seat surface for the quantity of filter material 18, which has a distal flat surface, to be pressed against tightly when the combined oil filter and magnet apparatus 10 of the invention is fully assembled. The annular shoulder 76 prevents the quantity of filter material 18 from shifting laterally inside the oil filter housing. Moreover, advancement of the internal threads 66 of the second housing portion 82 and the external threads 68 of the first housing portion 80 provides for the tight fit of the filter material 18 inside the filter housing.

From the foregoing, it will be appreciated the housing parts 82 and 20 readily may be unscrewed relative to each other on order to gain access to the interior of filter housing 12 in order to remove a used quantity or cartridge of filter material 18 and flush out or otherwise remove any filtered metallic or ferro-magnetic particles adhering to the outside surface of wall portion 29. A fresh filter cartridge 18 may then be inserted and the first and second housing parts screwed together to reassemble the filter housing prior to reinserting in receptacle 30 the magnet unit 28.

Turning to FIGS. 7–11, reference numerals are shown that correspond to like reference numerals that designate like elements shown in the other figures. In this alternatively preferred embodiment, the removable and reusable magnet unit is employed with a modified oil filter 12'. Oil filter 12' includes a removable and reusable magnet unit 46 that is adapted to be supported completely external to the centrally located filtered oil flow space 13, i.e. there is no receptacle for the magnet unit protruding inside the interior of the filter housing 20 in the direction of oil space 13 as in the embodiment of FIGS. 2–6. More specifically, the removable and reusable magnet unit 46 is located directly on the bottom facing surface of the housing 20 as viewed in FIGS. 7, 9 and 10, concentric with respect to the imaginary central longitudinal axis of the oil filter 12'. The removable and reusable magnet unit 46 includes a heat sink portion 44 that rests on the oil filter housing 20, and a magnet 43 is attached to a topside of the heat sink portion 44. A suitable magnet unit 46 can be the magnet unit disclosed in my prior U.S. Pat. No. 5,510,024, the disclosure of which patent hereby is incorporated herein by this reference. Other well known magnet units employed on the external surface of a conventional oil filter housing for attracting metallic or ferro-magnetic particles in engine oil may be used instead.

The alternatively preferred oil filter 12' further includes a pair of magnet unit support members 32 connected to the oil filter housing 20. The magnet unit support members 32 include lock bolt reception channels 34, and the magnet unit support members 32 extend longitudinally outward from the oil filter housing 20.

Figure 9:
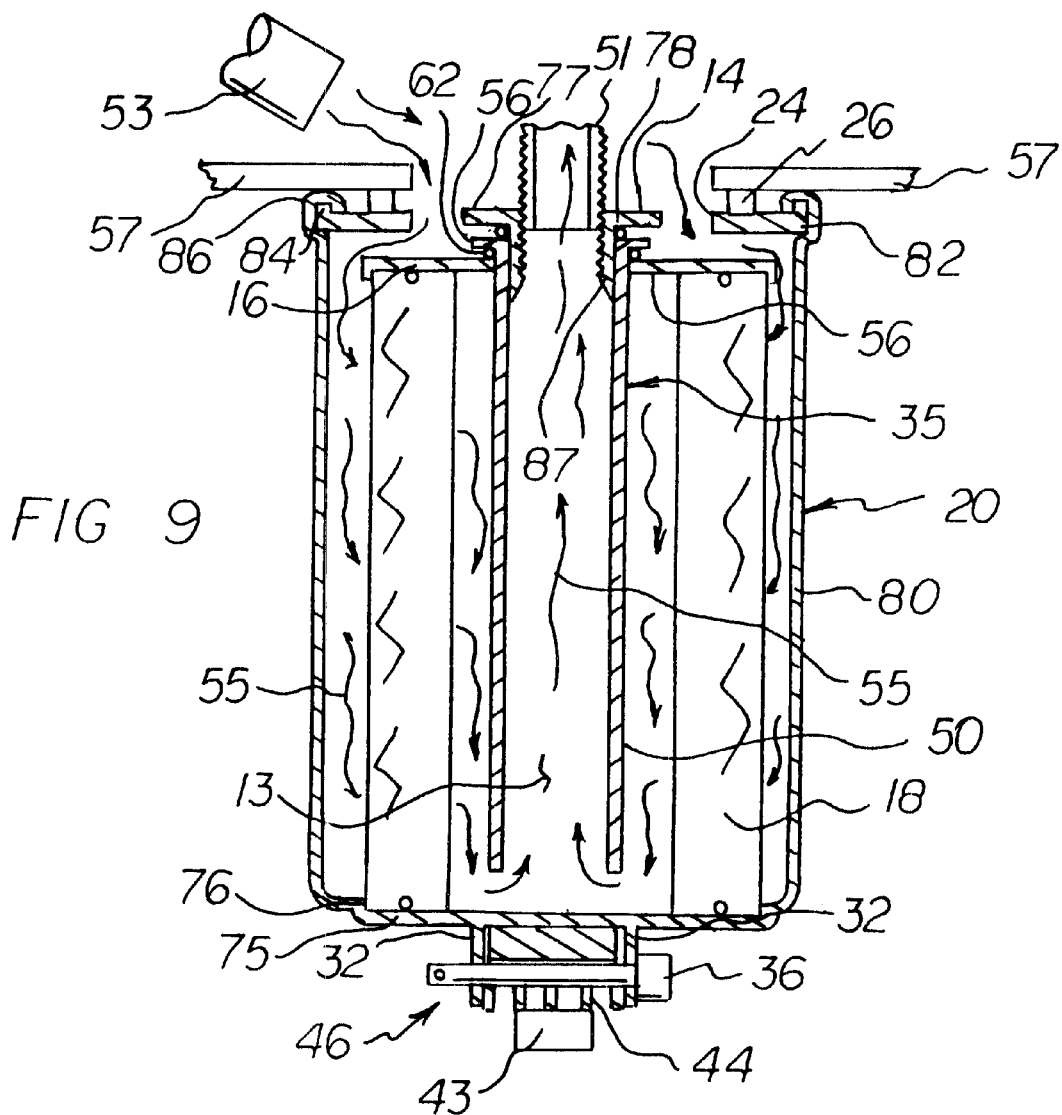
FIG. 9 is a cross-sectional view of the embodiment of the invention shown in FIG. 8 taken along line 9—9 thereof.
Figure 10:
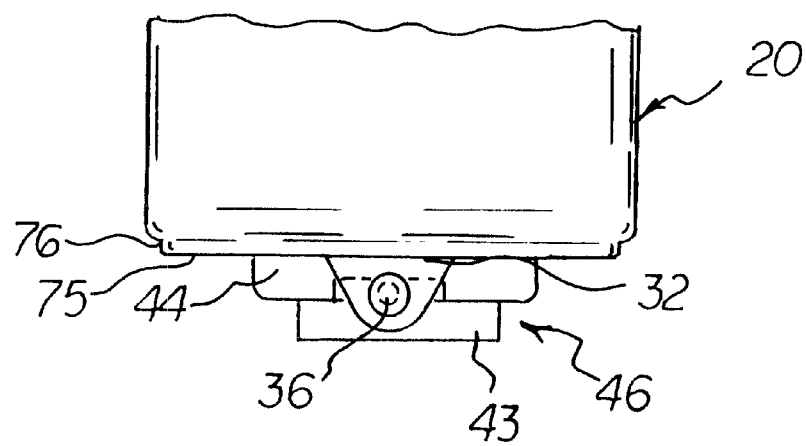
FIG. 10 is a partial side view of the embodiment of the invention shown in FIG. 9 taken along line 10—10 thereof.
Figure 11:
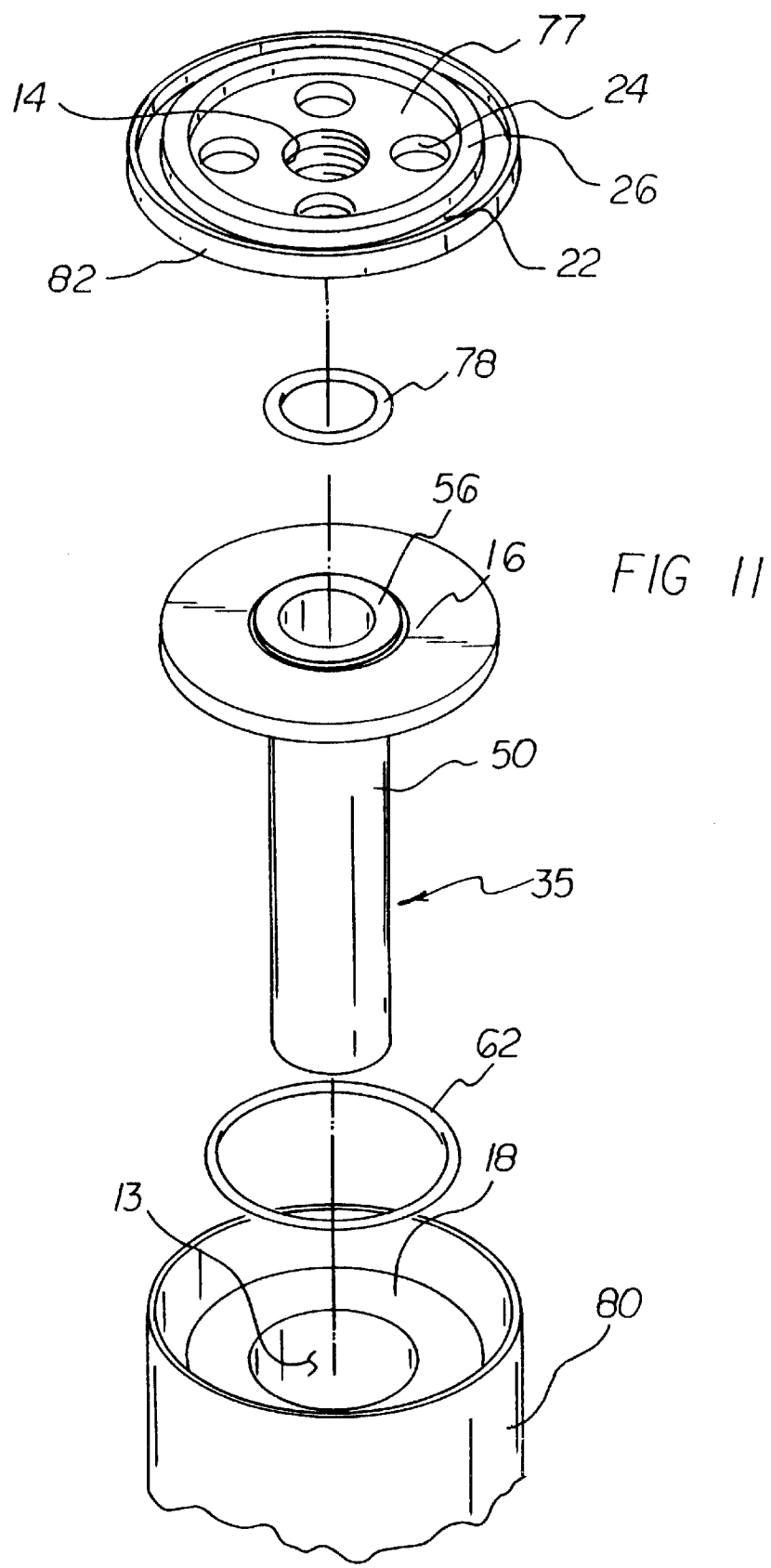
FIG. 11 is a partially exploded perspective view of the embodiment of the invention shown in FIGS. 7–10 showing an oil flow director that is located in the centrally located filtered oil flow space.

The oil flow director 35 includes a flat director base portion 56 and a director wall portion 50 that extends longitudinally along the imaginary central axis of the oil filter 12' from the director base portion 56 (or downward from the flat director base portion 56 as viewed in FIG. 9). The flat director base portion 56 and the director wall portion 50 can be made as a unified, one-piece structure.

In addition, the first housing portion 80 includes a flat bottom 75 that is inside the oil filter housing, and the bottom end of the oil flow director 35 is located in the vicinity of the flat bottom 75. The removable and reusable magnet unit 46 is placed on the outside surface of the end wall defining the flat bottom 75, and the magnetic flux from the removable and reusable magnet unit 46 impinges on the oil flowing inside the oil filter housing so that metallic or ferro-magnetic particles are trapped on the inside surface of the flat bottom 75.

As shown in FIG. 9, the oil output fitting 14 has a fitting flange 77 and an internally threaded descending tubular portion 87. A sealing ring 78 is located between the fitting flange 77 and the flat director base portion 56. The externally threaded oil filter reception post 51 screws into the internally threaded descending tubular portion 87.

As shown in FIG. 9, the second housing portion 82 includes an upstanding lip 84, and the first housing portion 80 includes a wrap-around rolled edge 86 which fits tightly over and around the upstanding lip 84. The use of the upstanding lip 84 and the wrap-around rolled edge 86 facilitates a relatively easy method for manufacturing a completed oil filter housing.

Use of the second embodiment of the invention shown in FIGS. 7–11 is very similar to the use of the first embodiment of the invention disclosed above. However, a difference in use rests upon the fact that with this second embodiment of the invention, the removable and reusable magnet unit 46 is not inserted into the oil filter 12'. Instead, as shown most specifically in FIG. 9, oil flow is directed by the oil flow director 35 to the close vicinity of surface 75 of the housing 20, which surface is defined by the end wall upon which the removable and reusable magnet unit 46 resides. Strong magnetic fields from the removable and reusable magnet unit 46 impinge upon the directed oil flow in the vicinity of the removable and reusable magnet unit 46. As a result, ferro-magnetic particles in the oil are attracted by the removable and reusable magnet unit 46 and are held by the magnetic field up against the inside flat bottom 75 of the first housing portion 80. As long as the removable and reusable magnet unit 46 is fixed to the top of the first housing portion 80, the ferro-magnetic particles, separated from the oil by the magnetic force, are held to the inside surface of the bottom of the first cartridge housing portion 80.

When it is desired to change the disposable oil filter 12', the oil filter 12' is unscrewed from the threaded oil filter reception post 51, and oil is drained out from the oil filter 12'. Then, the lock bolt 36 is removed from the magnet unit A support members 32 as described above, and the removable and reusable magnet unit 46 is separated from the oil filter 12'. When this is done, the entire oil filter including its internal quantity of oil filter material or cartridge 18 can be discarded, and the ferro-magnetic particles retained inside the oil filter 12 are discarded along with the oil filter 12'. Then, a new oil filter 12' is obtained. The removable and reusable magnet unit 46 is attached to the new oil filter 12' by using the lock bolt 36, the magnet unit support members 32, and the lock pin 38. The new oil filter 12' can then be screwed onto the threaded oil filter reception post 51 as will be apparent to a routineer.

Figure 12:
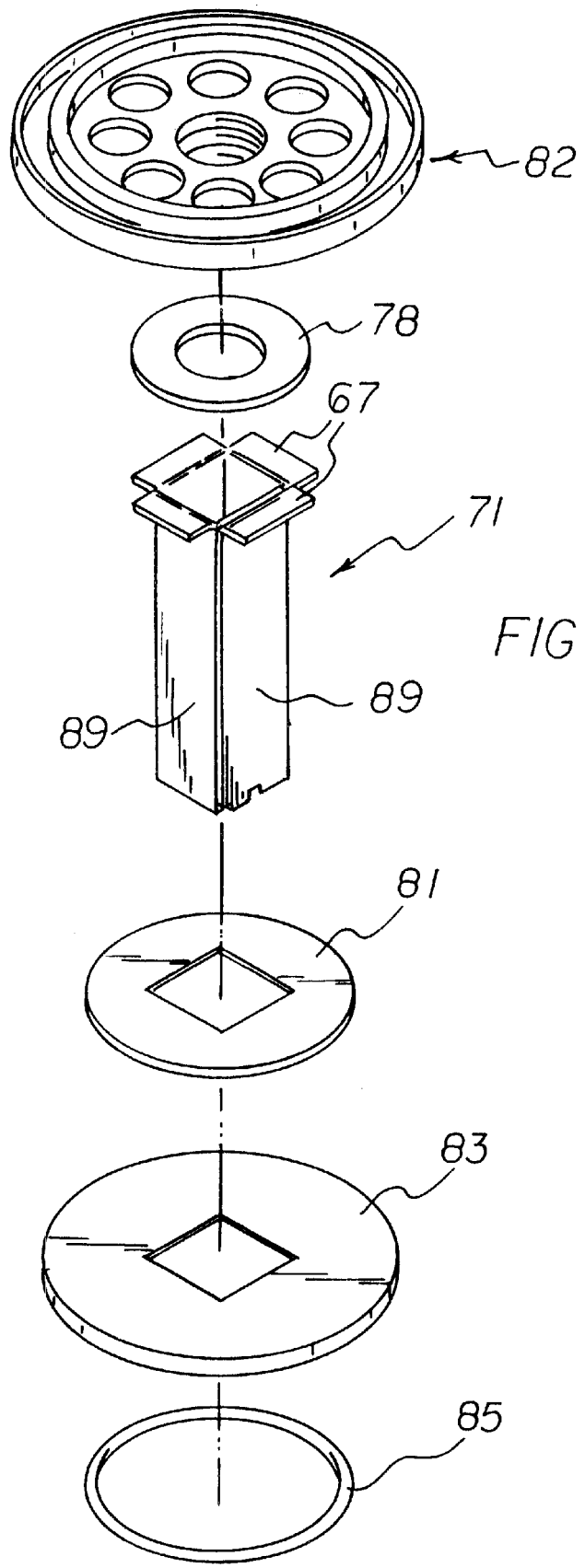
FIG. 12 is a partially exploded perspective view of a third embodiment of the invention which includes an oil flow director that is made from a blank of flat material and that has a rectangular cross-section.
Figure 13:
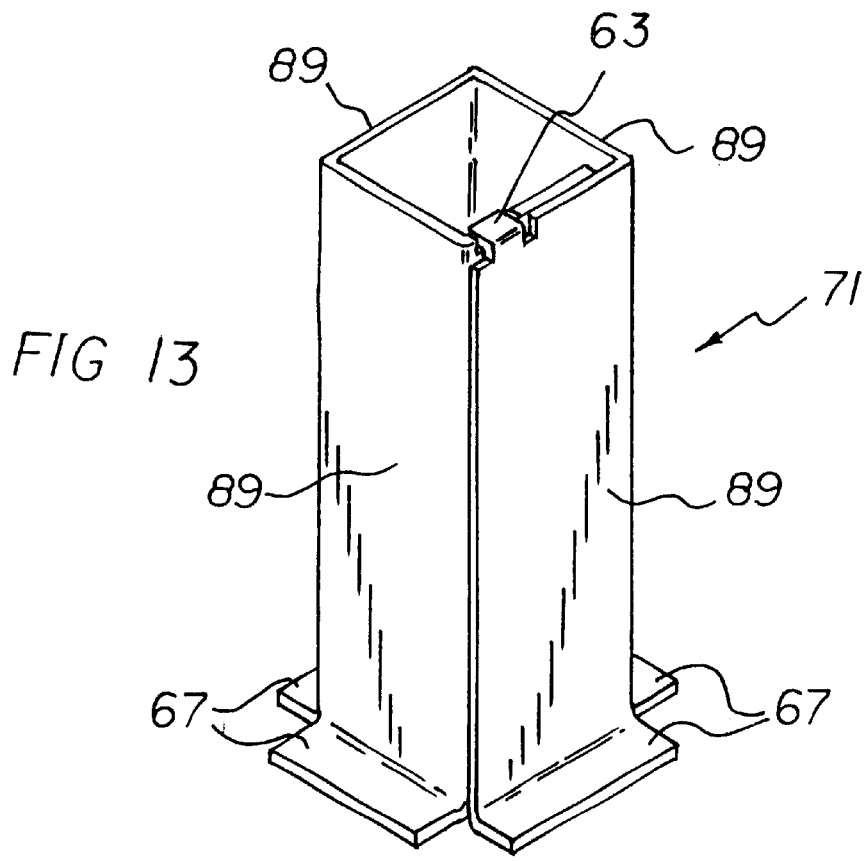
FIG. 13 is an enlarged perspective view of the oil flow director shown in FIG. 12.
Figure 14:
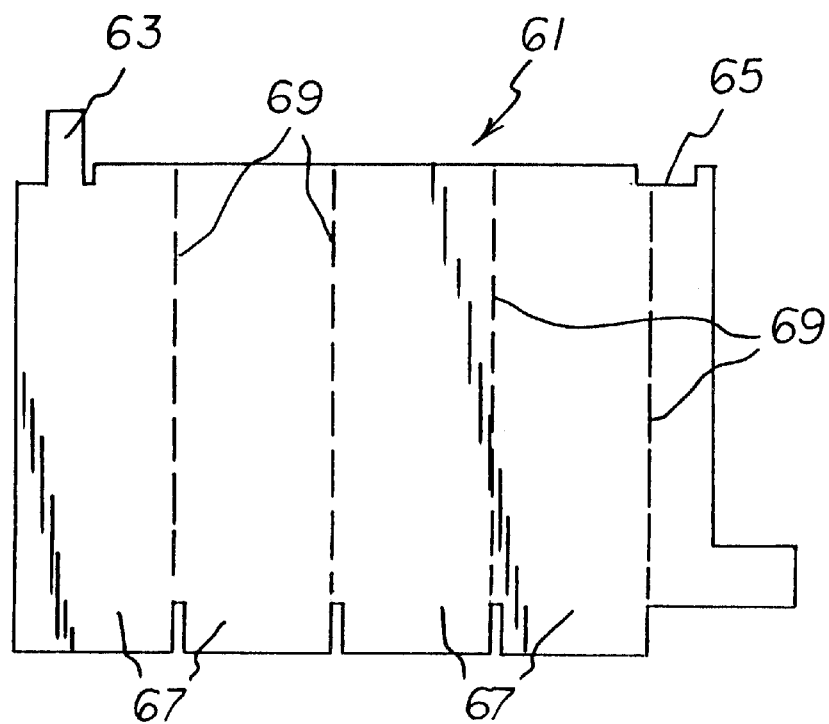
FIG. 14 is a top view of a blank that is folded to provide the oil flow director shown in FIGS. 11 and 12.

Turning now to FIGS. 12–14, reference numerals are shown that correspond to like reference numerals that designate like elements shown in the other figures. In the prior preferred embodiments, the oil flow director (25 or 35) includes a director base portion and a director wall portion that extends longitudinally along the imaginary axis of the oil filter housing and is substantially circular in cross-sectional shape. Alternatively, the director wall portion of either flow director 25 or 35 may be comprised of a plurality of planar wall portions 89 which form a fully formed flow director 71 having a polygonal or square cross-sectional shape.

As best seen FIGS. 13 and 14, the fully formed polygonal or square cross-section director 71 suitable for use in the present invention may be formed from a flow director blank 61 which includes a wall lock tab 63, a lock tab reception notch 65, and a plurality of wings 67. To form the fully formed polygonal or square cross-section director 71 from the flow director blank 61, planar wall portions 89 are formed by folding portions of the flow director blank 61 along blank fold lines 69. Once a four-sided fully formed polygonal or square cross-section director 71 is formed, the wall lock tab 63 is bent over the lock tab reception notch 65, whereby the fully formed director 71 is locked into the fully formed formation. Then, the wings 67 are bent outward. Alternatively, flow director 71 may be fabricated as a unitary piece as by extrusion or other known forming method.

It will be observed that the polygonal or square cross-section oil flow director 71 provides a greater cross-sectional area than a corresponding cylindrical oil flow director. As a result, the velocity of the volume of oil flowing through the oil filter is reduced resulting in an increase in magnetic filtering efficiency. Along with the polygonal or square cross-section oil flow director 71, a first polygonal or squared-opening gasket 81, a second polygonal or squared-opening gasket 83, and an additional sealing ring 85 are provided the purpose of which will be apparent from the foregoing description.

The components of the combined oil filter and magnet apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved combined oil filter and magnet apparatus that is low in cost, relatively simple in design and operation, and which may advantageously be used to direct a concentrated flow of oil inside the oil filter in the vicinity of a magnet attachment. With the invention, a combined oil filter and magnet apparatus is provided which can easily be fitted into and can easily be removed from an oil filter housing. With the invention, a combined oil filter and magnet apparatus provides a removable and reusable magnet unit can be fitted into the centrally located filtered oil flow space of an oil filter housing. With the invention, a combined oil filter and magnet apparatus provides an oil flow director that is installed in the centrally located filtered oil flow space so as to direct a concentrated flow of oil to the vicinity of a removable and reusable magnet unit. With the invention, a combined oil filter and magnet apparatus is provided which employs a disposable and replaceable oil filter cartridge and employs a removable and reusable magnet unit that can be removed from the oil filter prior to disposal of the oil filter cartridge therein and can be reused in an oil filter having a new filter cartridge that replaces the prior used oil filter cartridge. With the invention, a combined oil filter and magnet apparatus is provided which employs a disposable oil filter and employs a removable and reusable magnet unit that can be removed from the disposable oil filter and re-used with a fresh oil filter.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A combined oil filter and magnet apparatus, comprising:
    an oil filter housing which includes a first end having an oil output fitting and a second end opposite said first end, a filter material/flow director support attached to the oil output fitting, a quantity of filter material carried by said filter material/flow director support, a centrally located filtered oil flow space defined by said quantity of filter material, an oil flow director attached to said filter material/flow director support and extending into said centrally located filtered oil flow space, wherein said oil flow director has a first open end connected to the oil output fitting and a second open end proximate the second end of the housing such that all of the oil passing through said filter material exits said filtered oil flow space through the second open end of the oil flow director, and
    a removable and reusable magnet unit removably attached to said oil filter housing, wherein said removable and reusable magnet unit is located on an external surface of a wall defining the second end of said oil filter housing coaxially with respect to said oil flow director and said centrally located filtered oil flow space such that the magnetic flux of said removable and reusable magnet unit substantially is concentrated in said centrally located filtered oil flow space defined by said quantity of filter material whereby oil flowing through said apparatus is effectively exposed to said magnetic flux after passing through said quantity of filter material.

2. The apparatus of claim 1 wherein said removable and reusable magnet unit includes a reusable magnet unit that is partially received in said centrally located filtered oil flow space.

3. The apparatus of claim 2 wherein said oil-flow-space-received removable and reusable magnet unit is partially nested inside said oil flow director.

4. The apparatus of claim 1 wherein said oil flow director is oriented along an imaginary central longitudinal axis of said oil filter.

5. The apparatus of claim 1 wherein said oil flow director includes:
    a director base portion, and
    a director wall portion that extends longitudinally from said director base portion.

6. The apparatus of claim 1 wherein:
    said wall of the oil filter housing includes a magnet unit entry port located distal to said oil output fitting, a continuous wall portion extending between said entry port and said oil output fitting, and
    a portion of said removable and reusable magnet unit extends through said magnet unit entry port into said centrally located filtered oil flow space bounded by said continuous wall portion.

7. The apparatus of claim 6 wherein said removable and reusable magnet unit includes a first lock bolt reception channel, said apparatus further including:
    magnet unit support members attached to said oil filter housing adjacent to said magnet unit entry port, wherein said magnet unit support members include second lock bolt reception channels,
    a lock bolt received in said first lock bolt reception channel and said lock bolt reception channels, and
    a lock pin received in said lock bolt for securing said lock bolt to said magnet unit support members and said removable and reusable magnet unit.

8. The apparatus of claim 6 wherein said removable and reusable magnet unit includes:
    a magnet support rack, and
    a plurality of individual magnets received in said magnet support rack.

9. The apparatus of claim 8 wherein at least one of said magnets has a member of ferro-magnetic material associated with it for re-orienting the flux field of said magnet.

10. The apparatus of claim 8 wherein:
    said magnet support rack includes a heat sink portion, and
    further includes a first lock bolt reception channel located proximal to said heat sink portion.

11. The apparatus of claim 8 wherein said magnets are cylindrical magnets formed from neo-dymium iron boron.

12. The apparatus of claim 8 wherein said cylindrical magnets are arrayed in said magnet support rack with their respective longitudinal axes lying in planes that are parallel to each other.

13. The apparatus of claim 8 wherein said cylindrical magnets are arrayed in said magnet support rack with their respective longitudinal axes lying in parallel planes and their respective longitudinal axes rotated ninety degrees in their respective planes with respect to longitudinal axes of adjacent cylindrical magnets.

14. The apparatus of claim 1 wherein said removable and reusable magnet unit includes a removable and reusable magnet unit located on a portion of said wall of the second end of said housing that is completely external to said centrally located filtered oil flow space.

15. The apparatus of claim 14 wherein said removable and reusable magnet unit is located on said oil filter housing along a central longitudinal axis of said oil filter housing.

16. The apparatus of claim 14 wherein said removable and reusable magnet unit includes:

a heat sink portion that rests on said oil filter housing, and a magnet attached to a topside of said heat sink portion.

17. The apparatus of claim 14, further including:

a pair of magnet unit support members connected to said oil filter housing, wherein said magnet unit support members include lock bolt reception channels, and wherein said magnet unit support members extend longitudinally outward from said oil filter housing.

18. The apparatus of claim 1 wherein said oil flow director includes:

a flat director base portion, and a director wall portion that extends longitudinally outward from said flat director base portion.

19. The apparatus of claim 1 wherein said oil filter housing includes:

a first housing portion which includes external threads, a second housing portion which includes an outer wall portion which includes internal threads, and wherein said first housing portion and said second housing portion are connected together by screwing said external threads into said internal threads.

20. The apparatus of claim 19 wherein said second housing portion includes said oil output fitting which includes a baffle portion for directing oil flow from said oil flow director.

21. The apparatus of claim 19 wherein said oil output fitting of said second housing portion includes an annular fitting shoulder which receives a top portion of said oil flow director.

22. The apparatus of claim 19 wherein:

said second housing portion includes an upstanding lip, said first housing portion includes a wrap-around rolled edge which fits tightly over and around said upstanding lip.

23. The apparatus of claim 19 wherein said first housing portion includes a flat bottom that is formed by the wall defining the second end of the housing.

24. The apparatus of claim 1 wherein the wall defining the second end of said housing includes:

a flat annular region, and an annular shoulder extending toward said first end of the housing from said flat annular region.

25. The apparatus of claim 1 wherein:

said oil flow director includes a director base portion and a director wall portion that extends longitudinally outward from said director base portion, said director wall portion is comprised of a plurality of planar wall portions which form a polygonal cross-section director.

26. The apparatus of claim 25 wherein said polygonal flow director has a square cross-section.

* * * * *